United States Patent

[11] 3,581,298

[72] Inventor Shahbuddin A. Billawala
Thousand Oaks, Calif.
[21] Appl. No. 816,979
[22] Filed Apr. 17, 1969
[45] Patented May 25, 1971
[73] Assignee Burroughs Corporation
Detroit, Mich.

[54] SUPPORT DEVICE FOR MAGNETIC HEAD
27 Claims, 9 Drawing Figs.

[52] U.S. Cl. .......... 340/174.1, 179/100.12, 248/204, 267/158
[51] Int. Cl. .......... G11b 5/60, F16f 1/02
[50] Field of Search .......... 248/204; 267/158, 161, 163; 179/100.2 (P); 340/174.1 (E)

[56] References Cited

UNITED STATES PATENTS 3,310,792 3/1967 Groom et al. .......... 179/100.2

*Primary Examiner*—J. Russell Goudeau
*Attorney*—Christie, Parker and Hale

ABSTRACT: A support device for floating a magnetic head on a fluid atmosphere adjacent a recording surface has several features in a one piece construction. The support device is a substantially flat, thin body structure of elastic material having perforations therein positioned and shaped to form a platform to which a magnetic head is bonded. A portion of the platform is permanently deformed to lie forward of the remainder of the body structure so the magnetic head is spaced from the remainder of the body structure. A pair of mounting tabs extend inwardly from opposite sides of the outer perimeter of the support device. The portions of the support device adjacent to the tabs are bowed inwardly away from the tabs. A cable support bracket is directly joined to the tabs so forces exerted on the bracket do not effect the position of the magnetic head.

INVENTOR.
SHAHBUDDIN A. BILLAWALLA
BY
Christie, Parker & Hale
ATTORNEYS

SUPPORT DEVICE FOR MAGNETIC HEAD

BACKGROUND OF THE INVENTION

This invention relates to magnetic recording heads for reading and writing on a magnetic recording surface and, more particularly, to an improved support device for such magnetic heads in a one piece construction.

R. G. Groom et al. U.S. Pat. 3,310,792, which issued Mar. 21, 1967, to the assignee of the present application, discloses a very effective support device for a magnetic head assembly in a one piece construction. The support device comprises a flat, thin piece of elastic material having perforations therein positioned and shaped to form a head mounting platform, an inner rectangular frame surrounding the platform, and an outer rectangular frame surrounding the inner frame. One pair of links connect opposite sides of the platform with the inner frame and another pair of links, which are transverse to the first pair, connect opposite sides of the inner frame to the outer frame. Mounting tabs, which extend outwardly from the outer frame, are used to secure the support device to a stationary frame. When the end of an elongated actuating member pushes the platform toward the recording surface of a disc file, the support device floats the magnetic head so restrained rotation is permitted about a pivot point at the end of the actuating member. However, the support device inhibits rotation of the magnetic head relative to the recording surface so essentially no skew takes place.

Size and cost are important considerations in the design of a support device for a magnetic head. In order that the mounting platform may be smaller in area than the magnetic head assembly that is attached thereto a spacer is employed. The spacer is bonded to the platform, and the head assembly is bonded to the spacer by an epoxy cement. As a result, the head assembly does not interfere with the floating support furnished by the frames and the links. Further, the head assembly cannot inadvertently become bonded to the frames and links by misplaced cement. The provision of the spacer requires additional fabricating steps and material, which add to the cost of the equipment. It has also been found necessary to provide strain relief for the cable that connects the magnetic head assembly to its associated electronics. For this purpose, a bracket has been mounted to the stationary frame in the past. The bracket consumes additional space and requires several more fabricating steps. The mounting tabs for securing the support device to the stationary structure also consume space since they extend beyond the outer frame. This space consumption does not contribute to the desired characteristics of the support offered the magnetic head.

SUMMARY OF THE INVENTION

The invention concerns features of a support device for a magnetic head assembly in a one piece construction that reduce fabricating costs and space requirements.

According to one aspect of the invention, the platform of a support device on which the head assembly is mounted has a portion that is permanently deformed to lie forward of the remainder of the support device. The head assembly is bonded to the permanently deformed portion so it is spaced from the remainder of the support device. Consequently, no spacer is required to keep the head assembly away from the support device. The platform has two ends that are unattached to the remainder of the support device and the permanently deformed portion of the platform is at the unattached ends.

Another aspect of the invention is the formation of the mounting tabs so they extend inwardly from opposite sides of the outer frame of the support device. Thus, the support device occupies no more space than is required for its operative, i.e., head supporting parts. Preferably, the portions of the support device adjacent to the tabs are bowed inwardly away from the tabs to increase the perimeter of the supporting frames.

In another aspect of the invention, the head support device has a cable bracket that is joined directly to the mounting tabs so forces exerted on the cable bracket do not affect the position of the head assembly. Preferably, the bracket extends transversely from the remainder of the support device and the cable is looped through an opening between the bracket and the remainder of the support device such that the cable loop lies behind the head assembly. The cable bracket can be formed in the course of the stamping operation that forms the platform the supporting frames, and the connecting links. Similarly, the bracket can be bent into a transverse position in the same forming operation that produces the permanently deformed portion of the platform.

In summary, the described aspects of the invention are adapted to be incorporated into a support device for a magnetic head in a mutually cooperative fashion with a minimum number of additional fabricating steps and space consumption.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

Figure 1:
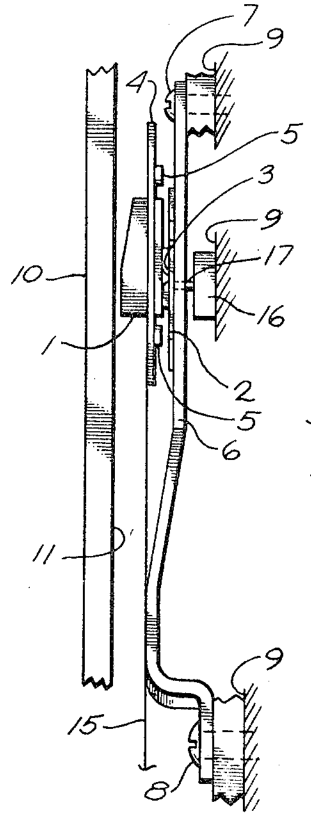
FIG. 1 is a side elevation view of a magnetic head assembly, its mounting apparatus, and a recording surface.

In FIG. 1, the components of a disc file information storage system are shown. A magnetic head assembly 1 is secured to a support device 2. Head assembly 1 contains a plurality of small, magnetic recording heads of the type conventionally used for reading and writing on rotating magnetic recording drums and discs. As discussed below in connection with FIGS. 2A and 2B and FIGS. 3 through 6, support device 2 has a permanently deformed forward portion 3 to which head assembly 1 is bonded with epoxy or another type of cement. A printed circuit board 4 is provided for mounting electronic switching circuits 5, which switch the output signals from the magnetic recording heads. Head assembly 1 is inserted through an aperture in circuit board 4 and securely attached thereto. Support device 2 has mounting tabs (not shown in FIG. 1) that secure it by screws (not shown in FIG. 1) to a stationary frame 6. Frame 6 is attached by screws 7 and 8 to a superstructure 9 near a magnetic recording surface 11 of a rotating magnetic disc 10. Disc 10 rotates at a high velocity and thereby forms an air film adjacent its recording surface upon which head assembly 1 floats while reading and writing. A cable 15 is provided for coupling switching circuits 5 to conventional electronics associated with the head assembly. Cable 15 is attached to bracket 6 (by means not shown) for strain relief.

Head actuating apparatus 16, which is mounted on superstructure 9, has a plunger 17 extending through an aperture in frame 6. Head actuating apparatus 16 could be constructed as shown in my U.S. Pat. No. 3,320,599 which issued May 16, 1967, to the assignee of the present application. In FIG. 1, plunger 17 is shown in its unactuated position. When plunger 17 moves to the left, as shown in FIG. 1, into operating position, it forces support device 2 toward disc 10 to place head assembly 1 into a floating position relative to the fluid atmosphere. Support device 2 is constructed to inhibit rotation of head assembly 1 relative to the recording surface of disc 10 and to allow restrained rotation of head assembly 1 in other directions about a pivot point at the end of plunger 17 while head assembly 1 is floating. FIGS. 2A and 2B and FIGS. 3 through 8 show various embodiments of support device 2. Each embodiment has certain parts in common that have the same reference numerals. Each embodiment of support device 2 could be fabricated by stamping it from a flat sheet of elastic material so all the parts are combined in a one piece construction.

Figure 2A:
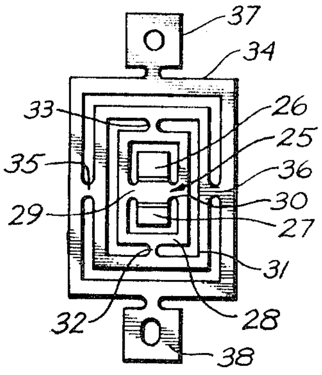
FIG. 2A and 2B are front elevation and side elevation views, respectively, of one embodiment of a magnetic head support device incorporating the principles of the invention.
Figure 2B:
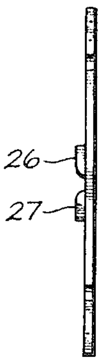

Reference is made to FIGS. 2A and 2B in which a rectangular platform 25 is shown. Platform 25 has permanently deformed forward portions 26 and 27 that lie in a plane that is forward of and parallel to the remainder of support device 2, as illustrated in FIG. 2B. Portions 26 and 27 could be formed in a die. A rectangular inner frame 28 surrounds platform 25. Links 29 and 30 connect opposite sides of platform 25 to inner frame 28. A rectangular intermediate frame 31 surrounds inner frame 28. Links 32 and 33 connect opposite sides of inner frame 28 to intermediate frame 31. Links 32 and 33 are transverse to links 29 and 30. A rectangular outer frame 34 surrounds intermediate frame 31. Links 35 and 36 connect opposite sides of intermediate frame 31 to outer frame 34. Mounting tabs 37 and 38 extend outwardly from outer frame 34. Magnetic head assembly 1 (FIG. 1) is bonded to portions 26 and 27. Thus, head assembly 1 is spaced from the remainder of the support device so it does not interfere with the supporting function of frames 28, 31, and 34 even though it is much larger than the area of platform 25. Support device 2 is secured to stationary frame 6 by screws that pass through the openings in tabs 37 and 38. When plunger 17 moves into operating position, its end pushes platform 25 toward magnetic surface 11. Since tabs 37 and 38 are fixed, frames 28, 31, and 34 deform accordingly to permit platform 25 to extend to the left as viewed in FIG. 1. It is to be noted that the U-shaped perforations between platform 25 and inner frame 28 form two ends that are unattached to the remainder of the support device. Portions 26 and 27 are formed at these unattached ends. This permits the permanent deformation of platform 25 without weakening it structurally.

Figure 3:
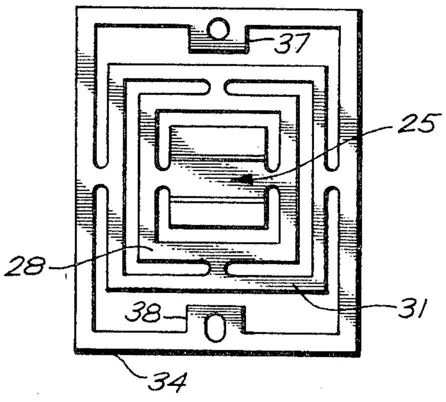
FIGS. 3 through 6 are front elevation views of other embodiments of head support devices incorporating the principles of the invention.

In FIG. 3, an embodiment is shown in which mounting tabs 37 and 38 extend inwardly from opposite sides of outer frame 34. Thus, the embodiment of FIG. 3 occupies less space than the embodiment of FIGS. 2A and 2B because tabs 37 and 38 are situated within the confines of outer frame 34.

Figure 4:
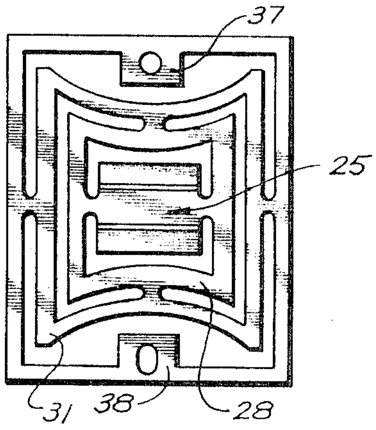

In the embodiment of FIG. 4, the portions of intermediate frame 31 adjacent tabs 37 and 38 are bowed inwardly away from tabs 37 and 38. This results in an increase in the perimeter of frame 31. In fact, a comparison of FIGS. 3 and 4 illustrates that the length of every side of frames 28 and 31 is increased. Thus, the deflecting ability of support device 2 is increased responsive to the force exerted on it by plunger 17. Further, more effective restrained rotational support is provided for head assembly 1 as it floats in the fluid atmosphere.

Figure 5:
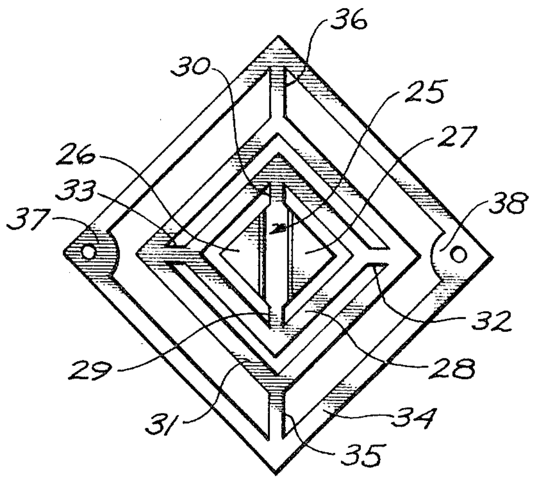

In FIG. 5, a square embodiment is shown in which head assembly 1 is mounted on a diagonal of the square. Permanently deformed forward portions 26 and 27 of platform 25 are triangular. Connecting links 29 and 30, 32 and 33, and 35 and 36 and tabs 37 and 38 are located at corners of the square. In some cases, this embodiment of support device 2 may fit the available space better than other embodiments.

Figure 6:
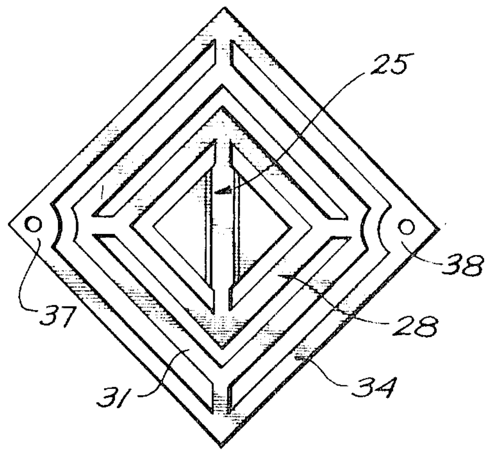

In the embodiment of FIG. 6, the portions of intermediate frame 31 adjacent to tabs 37 and 38 are bowed inwardly away from tabs 37 and 38 by truncating the corners of frame 31. As in the embodiment of FIG. 4, the embodiment of FIG. 6 enlarges the perimeter of intermediate frame 31 so more deflection is possible.

Figures 7, 8:
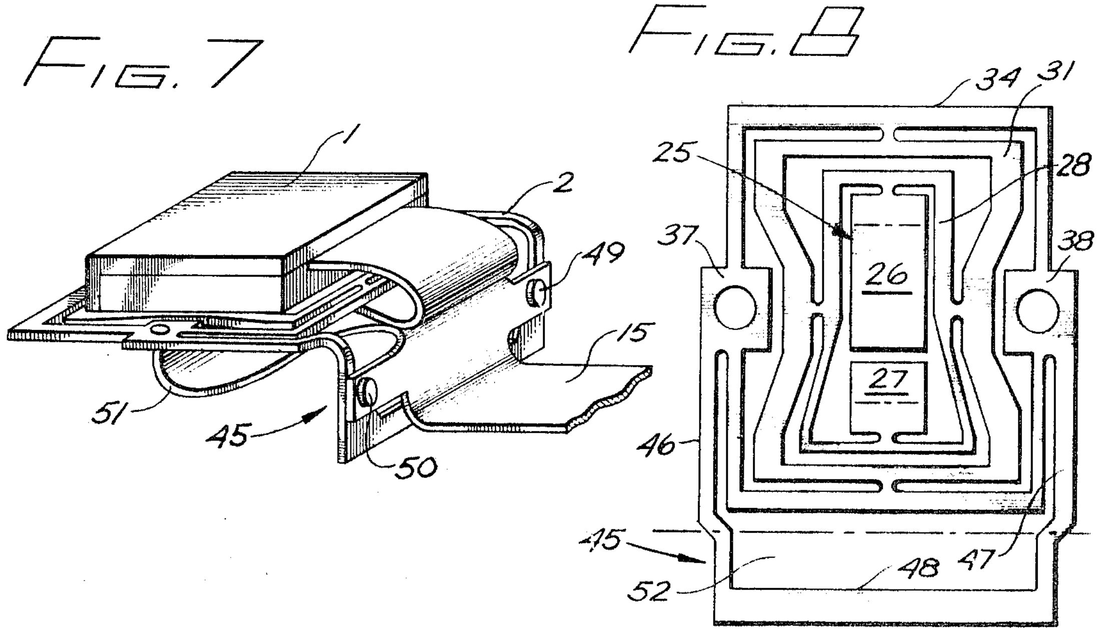
FIG. 7 is a perspective view of a magnetic head assembly, its cable, and a head support device having a cable bracket.
FIG. 8 is a front elevation view of the head support device of FIG. 7 before its parts are permanently deformed.

The embodiment shown in FIGS. 7 and 8 has a cable bracket 45 which comprises a U-shaped member having substantially parallel arms 46 and 47 joined by a crossarm 48. The ends of arms 46 and 47 are joined to tabs 37 and 38, respectively, which are attached directly to superstructure 9. As a result, frame 6 of FIG. 1 is eliminated. Bracket 45 is directly anchored to superstructure 9 and thus is isolated from platform 25 so the forces exerted on bracket 45 have no appreciable effect on the position of the head assembly. Crossarm 48 is bent transverse to the remainder of support device 2, as illustrated in FIG. 7. This could be done at the same time and in the same die in which portions 26 and 27 are permanently deformed. FIG. 8 shows support device 2 prior to its insertion in the die. The points at which the support device are to be deformed are depicted in FIG. 8 by phantom lines. Cable 15 is attached to crossarm 48 bracket 45 by rivets 49 and 50. Between its point of attachment to crossarm 48 bracket 45 and head assembly 1, a slack loop 51 is formed along the length of cable 15. Slack loop 51 lies on the opposite side of support device 2 from head assembly 1. The ends of slack loop 51 pass through an opening 52 formed between crossarm 48 and the adjacent side of outer frame 34. The attachment of cable 15 to crossarm 48 bracket 45 provides strain relief for cable 15. Any tensile force applied to cable 15 is isolated from its connection to head assembly 1 by slack loop 51.

I claim:

1. In combination, a magnetic recording means including a recording surface moving in a fluid atmosphere, a magnetic head assembly adapted for floating on the fluid atmosphere, a support device having a platform coupled to said head assembly, means for supporting the support device with the head assembly oriented adjacent the recording surface, and means including an actuating member having an end for forcing the head assembly into a floating position on the fluid atmosphere adjacent the moving recording surface, the support device including in a one piece construction an approximately flat thin body structure comprising an elastic material perforated to form the platform and a supporting network therefor that inhibits rotation of the head structure relative to the recording surface, allows restrained rotation of the head assembly in other directions about a pivot point at the end of the actuating member, and allows movement of the head assembly toward and away from the recording surface responsive to the actuating member, a portion of the platform being permanently deformed to lie forward of the remainder of the body structure, the head assembly being bonded to the permanently deformed portion so it is spaced from the remainder of the body structure.

2. The combination of claim 1, in which the permanently deformed portion is substantially parallel to the remainder of the body structure.

3. The combination of claim 1, in which the platform has two ends that are unattached to the remainder of the body structure and the permanently deformed portion of the platform is at the unattached ends of the platform.

4. The combination of claim 3, in which the body structure has an outer frame, two mounting tabs extend inwardly from opposite sides of the outer frame, and the support device is secured to the supporting means by the tabs.

5. The combination of claim 4, in which the body structure has a cable support bracket that is directly joined to the tabs so forces exerted on the bracket do not appreciably affect the restrained rotation of the head.

6. The combination of claim 5, in which the tabs extend inwardly toward each other from opposite sides of the outer frame and the perforations in the elastic material form at least one intermediate frame disposed between the outer frame and the platform, a first pair of oppositely disposed links connecting the platform to the intermediate frame, and a second pair of oppositely disposed links connecting the intermediate frame to the outer frame, the second pair of links being transverse to the first pair of links.

7. The combination of claim 6, in which the portions of the intermediate frame adjacent to the tabs are bowed inwardly away from the tabs.

8. The combination of claim 7, in which the perforations in the elastic material form an inner frame disposed between the intermediate frame and the platform so the first pair of links connects the intermediate frame to the inner frame, a third pair of oppositely disposed links connecting the inner frame to the platform, the third pair of links being transverse to the first pair of links, and a slit that divides the platform into two parts, the slit being transverse to the third pair of links.

9. In combination, a magnetic recording means including a recording surface moving in a fluid atmosphere, a magnetic head assembly adapted for floating on the fluid atmosphere, a support device coupled to the head assembly, means for supporting the support device with the head assembly oriented adjacent to the recording surface, the support device having two mounting tabs with which it is secured to the supporting means, and means including an actuating member having an end for forcing the head assembly into a floating position on the fluid atmosphere adjacent the moving recording surface, the support device including in a one piece construction an approximately flat thin body structure comprising an elastic material perforated to form an outer frame around the body structure, to inhibit rotation of the head structure relative to the recording surface, to allow restrained rotation of the head assembly in other directions about a pivot point at the end of the actuating member, and to allow movement of the head assembly toward and away from the recording surface, the tabs extending inwardly from the outer frame.

10. The combination of claim 9, in which the perforations in the elastic material form at least one intermediate frame between the outer frame and the platform, the portions of the intermediate frame adjacent to the tabs being bowed inwardly away from the tabs.

11. The combination of claim 9, in which the tabs extend inwardly from opposite sides of the outer frame.

12. In combination, a magnetic recording means including a recording surface moving in a fluid atmosphere, a magnetic head assembly adapted for floating on the fluid atmosphere, a support device coupled to said head assembly, means for supporting the support device with the head assembly oriented adjacent the recording surface, the support device having two mounting tabs with which it is secured to the supporting means and a cable support bracket, a head assembly cable secured to the cable support bracket with a slack portion between the head assembly and the cable support bracket, and means including an actuating member having an end for forcing the head assembly into a floating position on the fluid atmosphere adjacent the moving recording surface, the support device including in a one piece construction an approximately flat thin body structure comprising an elastic material perforated to form the two tabs and the cable support bracket, to inhibit rotation of the head structure relative to the recording surface, to allow restrained rotation of the head assembly in other directions about a pivot point at the end of the actuating member, and to allow movement of the head assembly toward and away from the recording surface, the cable support bracket being directly joined to the tabs so forces exerted on the cable do not appreciably affect the rotation of the head assembly.

13. The combination of claim 12, in which the cable support bracket extends transversely from the remainder of the body structure, an opening is formed in the body structure between the bracket and the remainder of the body structure, and the slack portion of the cable is disposed behind the remainder of the body structure with its ends passing through the opening.

14. A device arranged for guiding and supporting a magnetic recording head with respect to a fluid atmosphere adjacent a moving magnetic recording surface comprising a thin, flat elastic body having in a one piece construction a head support platform a portion of which is permanently deformed to lie in a plane spaced from the remainder of the flat elastic body, an inner support member disposed around the platform, an outer support member disposed around the inner support member, a first pair of connecting members between opposite sides of the platform and the inner support member, a second pair of connecting members between opposite sides of the inner support member and the outer support member, the second pair of connecting members being transverse to the first pair of connecting members, the connecting members and support members inhibiting rotation of the head support member relative to the plane of the flat body but causing the elasticity of the body to permit restrained rotational movement of the head support member in other directions about a pivot point on the plane of the flat elastic body.

15. The device of claim 14, in which, the inner and outer support members, and the platform are substantially quadrangular.

16. The device of claim 14, in which the permanently deformed portion of the platform has two ends that are unattached to the remainder of the elastic body.

17. The device of claim 16, in which the platform comprises two pads disposed adjacent to each other in spaced apart relationship to form the ends of the permanently deformed portion and the first pair of connecting members extends between the nonadjacent ends of the pads and the inner support member.

18. A device arranged for guiding and supporting a magnetic recording head with respect to a fluid atmosphere adjacent a moving magnetic recording surface comprising a thin, flat elastic body having in a one piece construction a head mounting platform, an inner support member surrounding the platform, an outer support member surrounding the inner support member, a first pair of connecting members between opposite sides of the platform and the inner support member, a second pair of connecting members between opposite sides of the inner member and the outer member, the second pair of connecting members being substantially transverse to the first pair of connecting members, and a pair of mounting tabs extending inwardly from opposite sides of the outer support member to secure the elastic body.

19. The device of claim 18, in which the outer edges of the tabs are flush with the outer edges of the outer support member.

20. The device of claim 18, in which the portions of the inner support member adjacent to the tabs are bowed inwardly away from the tabs to increase the perimeter of the inner support member.

21. A device arranged for guiding and supporting a magnetic recording head with respect to a fluid atmosphere adjacent a moving magnetic recording surface comprising a think flat elastic body having in a one piece construction a head mounting platform, an inner support member surrounding the platform, an outer support member surrounding the inner support member, a first pair of connecting members between opposite sides of the platform and the inner support member, a second pair of connecting members between opposite sides of the inner support member and the outer support member, the second pair of connecting members being substantially transverse to the first pair of connecting members, a pair of tabs disposed on opposite sides of the outer support member to secure the elastic body, and a cable support bracket directly joined to the tabs so forces exerted on the bracket do not appreciably affect the rotation of the platform.

22. The device of claim 21, in which the support bracket is a U-shaped member having two substantially parallel arms joined by a crossarm, the ends of the parallel arms joining the tabs and the crossarm being permanently deformed to extend transversely from the remainder of the elastic body.

23. A support device comprising in a one piece construction a load support member, a portion of the load support member being permanently deformed so it lies in a plane above the remainder of the load support member and an elastic interconnecting network surrounding and coupled to the load support member such that the elasticity thereof allows restrained rotational movement of the load support member about a pivot point and the network inhibits movement of the load support member parallel with a predetermined plane therethrough.

24. A support device comprising in a one piece construction a load support member, an elastic interconnecting surrounding and coupled to the load support member such that the elasticity thereof allows restrained rotational movement of the load support member about a pivot point and the network inhibits movement of the load support member parallel with a predetermined plane therethrough, and a pair of mounting tabs extending inwardly from opposite sides of the periphery of the network.

25. The support device of claim 24, in which the network includes a plurality of members one within the other and the portions of the members adjacent to the tabs are bowed inwardly away from the tabs.

26. A support device comprising in a one piece construction a load support member, an elastic interconnecting surrounding and coupled to the load support member such that the elasticity thereof allows restrained rotational movement of the load support member about a pivot point and the network inhibits movement of the load support member parallel with a predetermined plane therethrough, a pair of mounting tabs disposed on opposite sides of the periphery of the network, and a cable support bracket directly joined to the tabs so forces on the bracket do not appreciably affect the rotation of the load support member.

27. The device of claim 26, in which the cable support bracket is a U-shaped member having substantially parallel arms connected by a crossarm, the ends of the parallel arms being joined to the tabs and the crossarm being bent to extend transversely from the remainder of the device.

PO-1050
(5/69)
5887

UNITED STATES PATENT OFFICE
CERTIFICATE OF CORRECTION

Patent No. 3,581,298 Dated May 25, 1971

Inventor(s) Shahbuddin A. Billawala

It is certified that error appears in the above-identified patent and that said Letters Patent are hereby corrected as shown below:

Column 2, line 22, after "which" there should be a colon instead of a semicolon;
line 25, "FIG. 2A and 2B" should be --FIGS. 2A and 2B--.
Column 4, in lines 7, 8, and 14, "crossarm 48" should be deleted.
Column 6, line 38, "think" should be --thin--;
line 68, between "interconnecting" and "surround-" should be inserted --network--.
Column 7, line 6, between "interconnecting" and "surround-" should be inserted --network--.

Signed and sealed this 9th day of May 1972.

(SEAL)
Attest:

EDWARD M.FLETCHER,JR.
Attesting Officer

ROBERT GOTTSCHALK
Commissioner of Patents